(12) United States Patent
Kong et al.

(10) Patent No.: US 12,537,079 B2
(45) Date of Patent: Jan. 27, 2026

(54) METHOD AND DEVICE FOR GENERATING CLINICAL RECORD DATA

(71) Applicant: SEOUL NATIONAL UNIVERSITY R&DB FOUNDATION, Seoul (KR)

(72) Inventors: Hyoun-Joong Kong, Seoul (KR); Dan Yoon, Seoul (KR); Byeongsoo Kim, Seoul (KR); Sungwan Kim, Seoul (KR); Kyu Eun Lee, Seoul (KR); Su-jin Kim, Seoul (KR); Minwoo Cho, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 316 days.

(21) Appl. No.: 18/321,352

(22) Filed: May 22, 2023

(65) Prior Publication Data

US 2023/0290461 A1  Sep. 14, 2023

Related U.S. Application Data

(63) Continuation of application No. PCT/KR2021/017082, filed on Nov. 19, 2021.

(30) Foreign Application Priority Data

Nov. 20, 2020 (KR) .......... 10-2020-0156351

(51) Int. Cl.
*G16H 10/60* (2018.01)
*G06V 10/764* (2022.01)
*G16H 30/20* (2018.01)

(52) U.S. Cl.
CPC .......... *G16H 10/60* (2018.01); *G06V 10/765* (2022.01); *G16H 30/20* (2018.01); *G06V 2201/032* (2022.01)

(58) Field of Classification Search
CPC ......... G16H 30/40; G16H 10/60; G16H 50/20
See application file for complete search history.

(56) References Cited

FOREIGN PATENT DOCUMENTS

| JP | 2008-006169 A | 1/2008 | |
| JP | 2009-070272 A | 4/2009 | |
| JP | 2011167301 A | * 9/2011 | ............. A61B 19/00 |
| KR | 10-1880246 B1 | 7/2018 | |
| KR | 10-2020-0050262 A | 5/2020 | |
| KR | 20200050262 A | * 5/2020 | ............. G16H 10/60 |
| KR | 10-2180921 B1 | 11/2020 | |

OTHER PUBLICATIONS

Migitaka Takayuki, "Office Action in Japanese Application No. 2023-530913", Jan. 30, 2024, JPO.

* cited by examiner

*Primary Examiner* — Yuzhen Shen
(74) *Attorney, Agent, or Firm* — Bridgeway IP Law Group, PLLC; Jihun Kim (57) ABSTRACT

The present disclosure relates to a method and device for generating clinical record data for recording medical treatment. The method includes receiving medical data in which medical treatment, performed in advance, is recorded; recording information, included in the medical data, in a layer corresponding to an item related to the medical data from among a plurality of layers classified according to a plurality of items; and generating a clinical report based on the plurality of layers.

20 Claims, 11 Drawing Sheets

METHOD AND DEVICE FOR GENERATING CLINICAL RECORD DATA

TECHNICAL FIELD

The present disclosure relates to a method and device for generating clinical record data for recording medical treatment.

This work was supported by the Institute of Information & Communications Technology Planning & Evaluation (IITP) grant funded by the Korean government (Ministry of Science and ICT) (No. 1711116149, "Human resource development for the biomedical unstructured big data analysis," under Information & communications broadcasting innovations human resource development R&D program, Project Coordinator: Seoul National University R&BD Foundation, Project Period: 2021, Jan. 1~2021, Dec. 31).

BACKGROUND ART

After performing a medical treatment, including examinations, procedures, and surgery, the medical staff is required to manually write text-based records (reports) when creating documents to record the medical treatment.

In conventional situations, for example, during the process of performing endoscopy and procedures, the operator typically steps on the pedal to save a main scene and instructs a nurse to record information and time on the main content; if a follow-up examination or tracking observation is required, the medical staff checks the text records and confirms the records by reviewing images stored in the hospital information system (e.g., EMR, PACS).

In the case of laparoscopic or robotic surgery, too, since the basic surgical information is written in the form of simple text on the hospital information system (e.g., EMR) after completion of the surgery, reviewing the surgery for education, research, and treatment afterward is made with only text-based records, which makes it hard to grasp detailed information on the operation performed for the corresponding patient.

Furthermore, text-based records written after medical treatments are insufficient to fully convey the lesions or important clinical information found during medical practice, including examinations, procedures, and surgery, to other medical staff, as well as the medical staff who have led the medical treatment.

DISCLOSURE

Technical Problem

To solve the problem above, one embodiment of the present disclosure includes detecting meaningful frames in a clinical or engineering sense from image data related to examinations, procedures, and surgery and visualizing information on the detected frames in the temporal order.

Also, one embodiment of the present disclosure includes providing multimedia (images, videos, and signals)-based visual reports related to examination, procedure, and surgery records.

Other technical objects not described explicitly in the present disclosure may be additionally taken into consideration within the technical scope easily inferred from the detailed descriptions given below and the effects thereof.

In accordance with an aspect of the present disclosure, there is provided a method for generating clinical record data, the method may comprise: receiving medical data in which medical treatment, performed in advance, is recorded; recording information, included in the medical data, in a layer corresponding to an item related to the medical data from among a plurality of layers classified according to a plurality of items; and generating a clinical report based on the plurality of layers.

Herein, the recording of the information included in the medical data may include: classifying the medical data according to their type and recording the medical data in a layer corresponding to the data type among a plurality of layers of a first layer group; partitioning at least part of image data among the medical data into a plurality of image frames; performing a feature extraction algorithm on each of the plurality of image frames and extracting a feature frame including feature information to be recorded during the medical treatment; and recording the information on the feature frame in a layer corresponding to an event item related to the feature information among a plurality of layers of a second layer group.

Herein, the generating of the clinical report based on the plurality of layers may generate a clinical report by designating at least part of the plurality of layers of the first layer group and the plurality of layers of the second layer group according to their importance.

Herein, the feature information may include at least one of clinical information and metadata information, and the clinical information may include at least one of lesion information and non-lesioned object information, and the metadata information includes at least one of medical operation information and medical tool information.

Herein, the extracting of the feature frame including the feature information may designate one of the plurality of image frames as a reference frame, compare the reference frame with each of the remaining image frames, determine a shape corresponding to a lesion or a non-lesioned object, and extract an image frame including the shape corresponding to the lesion or non-lesioned object as a feature frame.

Herein, the extracting of the feature frame including the feature information may designate one point of a shape corresponding to a medical tool as a feature point, track the position of the feature point at predetermined time intervals over the plurality of image frames, and extract the image frame corresponding to the time point at which the position of the medical tool changes as a feature frame.

Herein, the extracting of the feature frame including the feature information may use a model pre-trained for the pixel correlation among the plurality of image frames based on in vivo images for learning and lesion images for learning to determine a shape corresponding to a lesion from each of the plurality of image frames; and extract an image frame including the shape corresponding to the lesion as a feature frame.

Herein, the information on the feature frame may include graphic information of the feature frame and visual information at the time the feature frame is positioned among the medical image data.

Herein, the recording in the plurality of layers of the second layer group records graphic information of the feature frame in a layer corresponding to an event item related to the feature information and stores visual information at the time the feature may be positioned together as an event index.

Herein, the generating of the clinical report based on the plurality of layers may generate a clinical report using information on a feature frame in a preset period among a plurality of layers of the first layer group and a plurality of layers of the second layer group.

In accordance with another aspect of the present disclosure, there is provided a device for generating clinical record data, the device may comprise: a memory; and a processor executing one or more instructions stored in the memory, wherein the instructions, when executed by the processor, cause the processor to perform actions including: receiving medical data in which medical treatment, performed in advance, is recorded; recording information, included in the medical data, in a layer corresponding to an item related to the medical data from among a plurality of layers classified according to a plurality of items; and generating a clinical report based on the plurality of layers.

According to the embodiments of the present disclosure described above, meaningful frames in a clinical or engineering sense may be detected from image data related to examinations, procedures, and surgery, and information on the detected frames may be visualized in the temporal order.

Also, since the embodiments of the present disclosure described above provide visual reports based on multimedia (images, videos, and signals) related to examinations, procedures, and surgery, the efficiency of delivering information on the examination records may be improved.

For those effects not explicitly mentioned herein, the effects expected by the technical features of the present disclosure and their potential effects are treated as if described in the present disclosure.

DESCRIPTION OF DRAWINGS

FIGS. 9A to 11 illustrate a clinical report generated by a method for generating clinical record data according to one embodiment of the present disclosure.

MODE FOR DISCLOSURE

Hereinafter, a method and device for generating clinical record data according to the present invention will be described in detail with reference to the accompanying drawings. The present invention may, however, be embodied in many different forms and should not be construed as limited to the embodiments set forth herein. In order to clearly explain the present invention, parts not related to the description are omitted, and the same reference numerals in the drawings indicate the same members.

The terms "module" and "unit" for components used in the following description are used only ease of description. Therefore, these terms do not have meanings or roles in and of themselves that would distinguish them from each other.

One embodiment of the present disclosure relates to a method and device for generating clinical record data.

Figure 1:
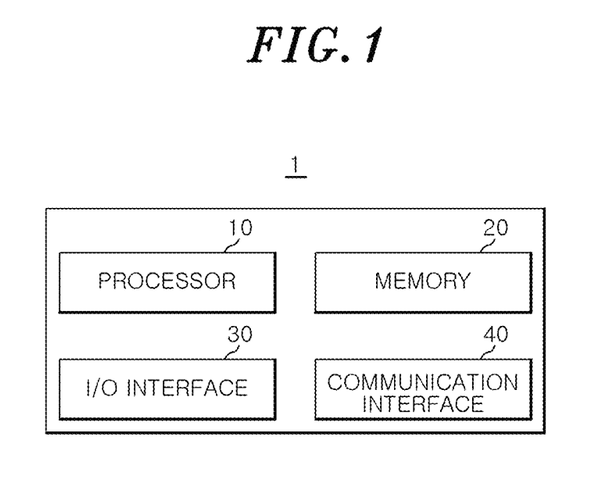
FIGS. 1 and 2 illustrate the block diagram of a device for generating clinical record data according to one embodiment of the present disclosure.
Figure 2:
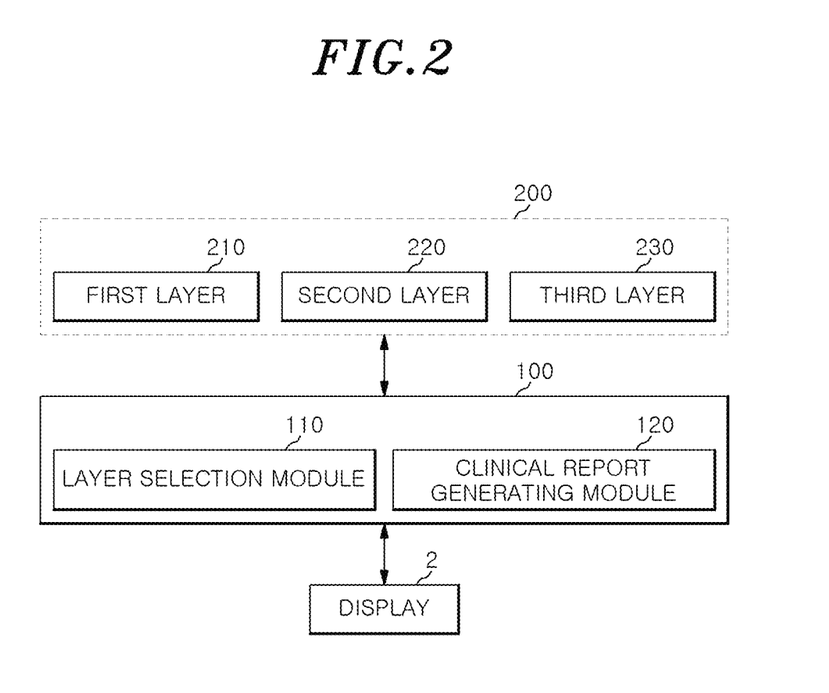

FIGS. 1 and 2 illustrate the block diagram of a device for generating clinical record data according to one embodiment of the present disclosure.

Referring to FIG. 1, a device 1 for generating clinical record data according to one embodiment of the present disclosure includes a processor 10, a memory 20, an I/O interface 30, and a communication interface 40.

The device 1 for generating clinical record data according to one embodiment of the present disclosure receives medical data, including examinations, procedures, and surgery, detects meaningful frames in a clinical or engineering sense, and visualizes information on the detected frames in the temporal order, thereby providing a visual report based on multimedia (images, videos, and signals) related to examination, procedure, and surgery records.

Here, meaningful frames in a clinical or engineering sense refer to the frames including surgical information that needs to be recorded, such as the information related to the occurrence of lesions or changes in surgical tools during medical treatment including examinations, procedures, and surgery.

The processor 10 executes one or more instructions stored in the memory 20.

The processor 10 receives medical data in which medical treatment, performed in advance, is recorded, records the medical data in a plurality of layers of a first layer group, partitions at least a part of image data among the medical data into a plurality of image frames, performs a feature extraction algorithm on each of the plurality of image frames, extracts a feature frame that includes feature information to be recorded during medical treatment, and records the information on the feature frame in a plurality of layers of a second layer group.

Figure 9A:
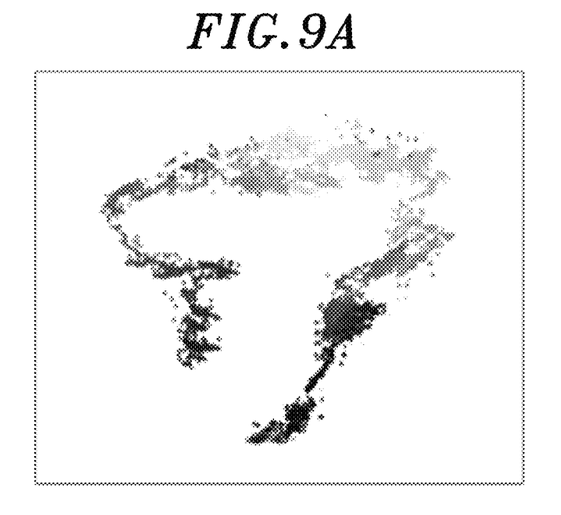
Figure 9B:
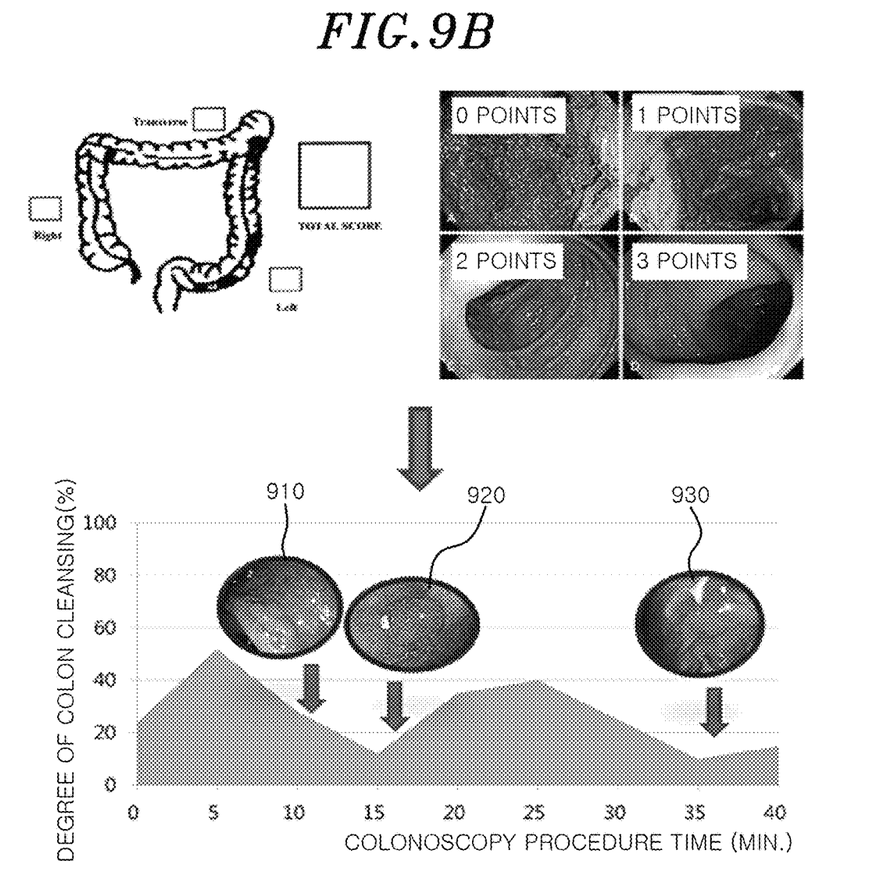
Figure 10:
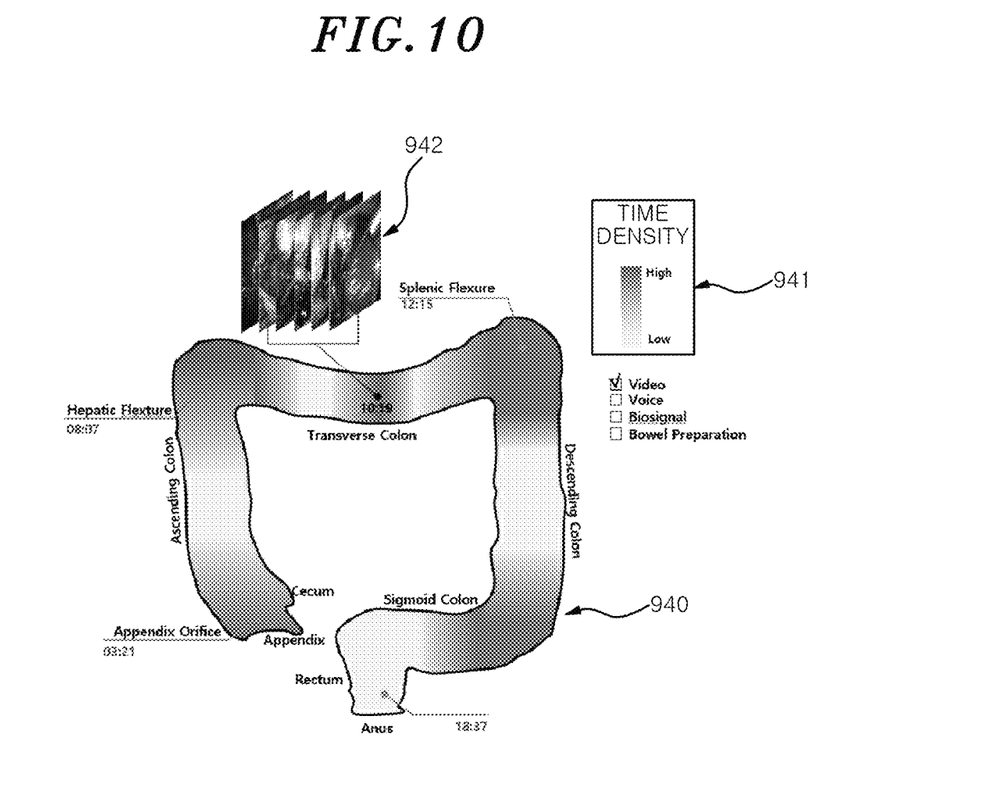
Figure 11:
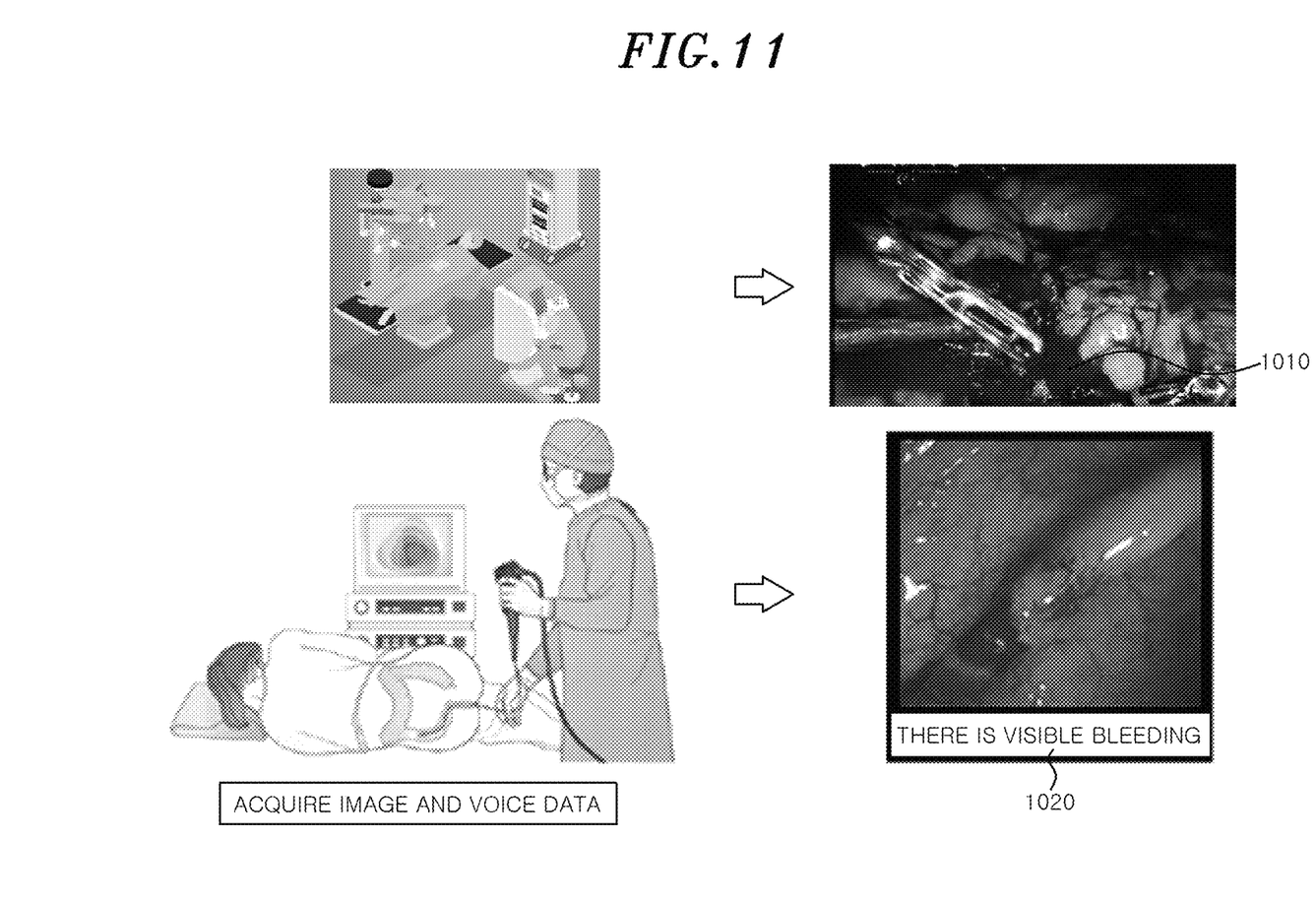

Also, the processor 10 creates a clinical report based on a plurality of layers according to the importance of feature information. Here, the clinical report refers to a visual report and highlights images expressed through visualization, which may be visualized as shown in FIGS. 9A, 9B, and 10 below or may be generated in the form of an image with embedded text, as shown in FIG. 11.

The processor 10 may be composed of a plurality of modules according to the respective functions, or the functions may be performed in one processor. The processor 10 may include one or more of a central processing unit (CPU), an application processor (AP), or a communication processor (CP). The processor 10 may, for example, execute calculations or data processing related to control and/or communication of at least one or more other constituting elements of the device 1 for generating clinical record data.

The memory 20 may store programs (one or more instructions) for processing and control of the processor 10.

The memory 20 may include volatile and/or non-volatile memory. The memory 20 may store, for example, commands or data related to at least one other constituting element of the device 1 for generating clinical record data.

The I/O interface 30 may serve as an interface capable of transmitting a command or data received from a user or an external device to other constituting element(s) of the device 1 for generating clinical record data. In one embodiment of the present disclosure, the I/O interface may be connected to a display or a user input device. Also, the I/O interface 30 may output commands or data received from other constituting element(s) of the device 1 for generating clinical record data to the user or other external device.

The communication interface 40 may configure communication between the device 1 for generating clinical record data and an external device or a server. For example, the communication interface 40 may be connected to a network through wireless or wired communication and communicate with the external device or the server.

Referring to FIG. 2, the memory 20 of the device 1 for generating clinical record data according to one embodiment of the present disclosure stores clinical record data 200 including a first layer 210, a second layer 220, and a third layer 230 generated by the processor 10.

The processor 10 of the device 1 for generating clinical record data according to one embodiment of the present disclosure may include a data providing unit 100 including a layer selection module 110 and a clinical report generating module 120; the processor 10 generates a clinical report based on a plurality of reports according to the importance of feature information using the clinical record data generated from the medical data recording previous medical treatment and transmits the created clinical report to the display 2 connected to the device 1 for generating clinical record data.

Accordingly, the user may check the created clinical report through the display.

Specifically, the processor 10 may include a function that creates a clinical report by selecting a desired layer from several types of layers according to user input and automatically creates a clinical report by collecting layers having clinical significance after setting a method for distinguishing layers having clinical importance in advance.

Also, the processor 10 may include a function that automatically creates a clinical report according to a desired priority set by a doctor; at this time, the priority may be designated in terms of polyps, bleeding, and resection.

Also, a clinical report may be created automatically based on records manually written by the medical staff; it is possible to improve the accuracy of the automated creation process by designing the processor 10 to learn the process of creating clinical reports based on manually written records.

The device for generating clinical record data according to one embodiment of the present disclosure makes it possible to analyze medical multimedia big data generated due to the increased use of non-radiation imaging equipment during medical treatment and may satisfy the demand for unstructured medical video data to apply AR/VR and artificial intelligence technologies to clinical sites.

Figure 3:
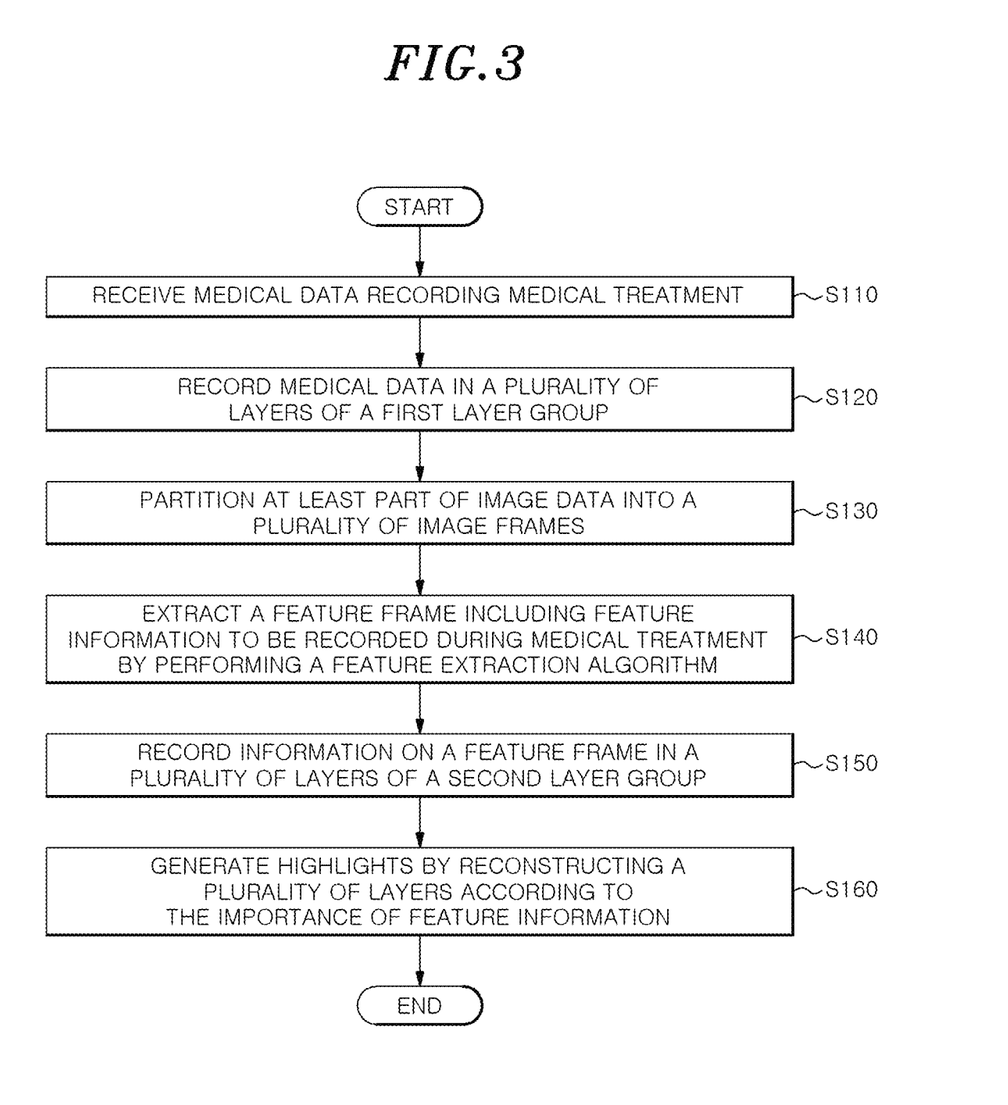
FIG. 3 is a flow diagram illustrating a method for generating clinical record data according to one embodiment of the present disclosure.

FIG. 3 is a flow diagram illustrating a method for generating clinical record data according to one embodiment of the present disclosure.

Referring to FIG. 3, a method for generating clinical record data according to one embodiment of the present disclosure starts with the S110 step of receiving medical data recording previous medical treatment by the processor of the device for generating clinical record data.

Afterward, from among a plurality of layers classified according to a plurality of items, the method records information, included in the medical data, in a layer corresponding to the items related to the medical data. Specifically, in the S120 step, medical data are classified according to their type and are recorded in a layer corresponding to the data type among a plurality of layers of the first layer group.

In the S130 step, at least part of image data among medical data is partitioned into a plurality of image frames.

The S140 step performs a feature extraction algorithm on each of the plurality of image frames and extracts a feature frame including feature information to be recorded during medical treatment.

Here, feature information includes at least one of clinical information and metadata information, where the clinical information includes at least one of lesion information and non-lesioned object information, and the metadata information includes at least one of medical operation information and medical tool information.

Specifically, according to one embodiment of the present disclosure, when an image processing algorithm is used, the S140 step of extracting a feature frame including feature information designates one of a plurality of image frames as a reference frame, compares the reference frame with each of the remaining image frames, determines a shape corresponding to a lesion or a non-lesioned object, and extracts an image frame including the shape corresponding to the lesion or non-lesioned object as a feature frame.

Also, one point of a shape corresponding to a medical tool is designated as a feature point, the position of the feature point is tracked at predetermined time intervals over a plurality of image frames, and the image frame corresponding to the time point at which the position of the medical tool changes is extracted as a feature frame.

According to another embodiment of the present disclosure, when a machine learning algorithm is used, the S140 step of extracting a feature frame including feature information uses a model pre-trained for the pixel correlation among a plurality of image frames based on the in vivo images for learning and lesion images for learning to determine a shape corresponding to a lesion from each of the plurality of image frames and extracts an image frame including the shape corresponding to the lesion as a feature frame.

In the S150 step, information on a feature frame is recorded in a layer corresponding to an event item related to feature information among a plurality of layers of a second layer group.

Specifically, from among a plurality of layers classified according to a plurality of event items, information on a feature frame is recorded in a layer corresponding to an event item related to feature information included in the feature frame.

Here, the information on the feature frame includes graphic information of the feature frame and visual information at the time the feature frame is positioned among medical image data.

In the S160 step, layers selected based on a plurality of layers are restructured to generate a clinical report.

Specifically, a clinical record report is created by designating at least part of the plurality of layers of the first layer group and the plurality of layers of the second layer group according to their importance, where the clinical record report may be created using the information of the first group in a preset period and the information on a feature frame in the second layer group. For example, a clinical record report may be created using graphic information of a feature frame stored as an event index along with the time information in a preset period and information recorded in a layer of the first layer group at the corresponding time point. In this case, audio information stored in the first layer group and graphic information according to lesions of the second layer group may be displayed together.

Figure 4:
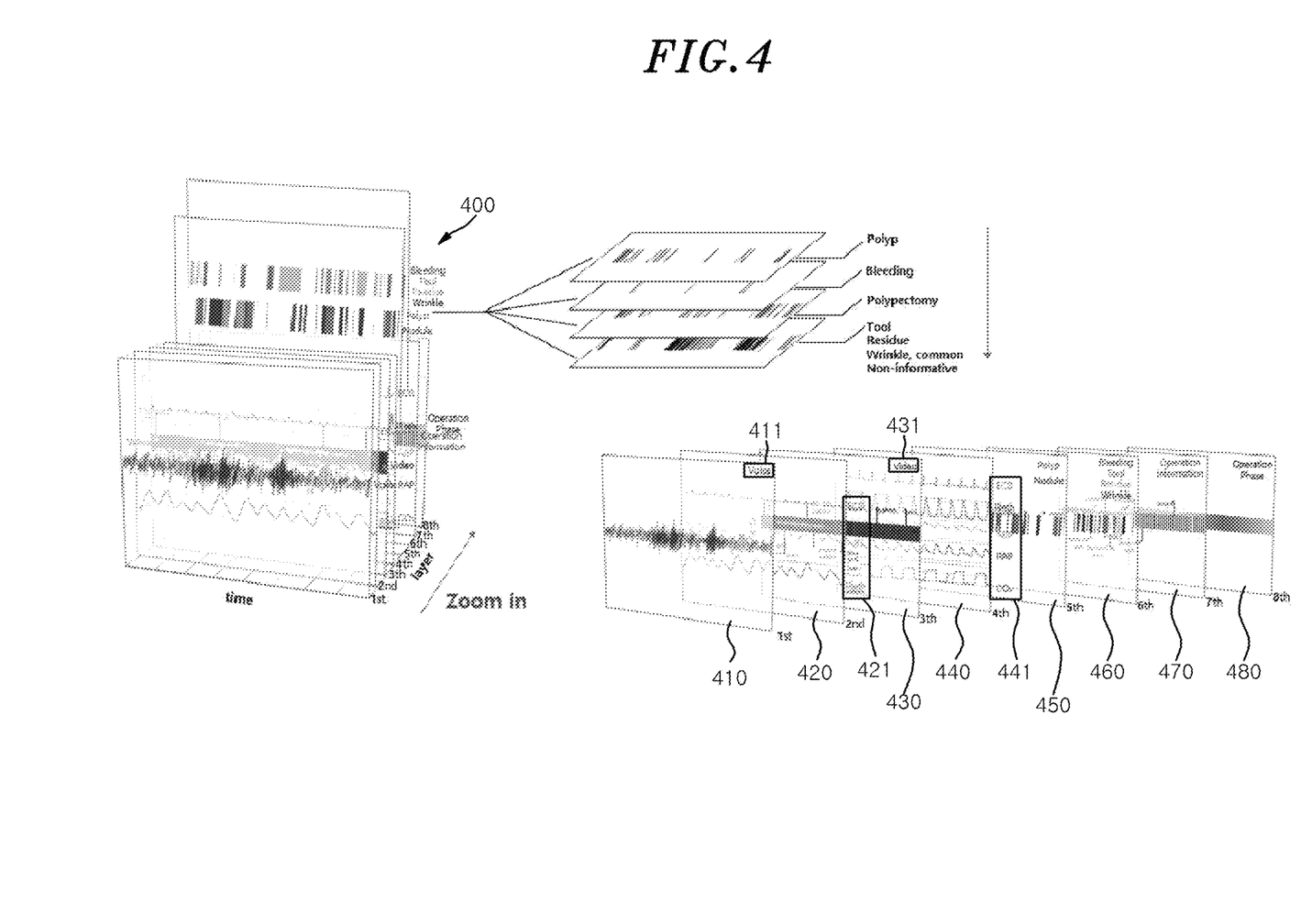
FIGS. 4 and 5 illustrate layers generated according to a method for generating clinical record data according to one embodiment of the present disclosure.

FIG. 4 illustrates layers generated according to a method for generating clinical record data according to one embodiment of the present disclosure.

The processor of the device for generating clinical record data according to one embodiment of the present disclosure receives medical data recording previous medical treatment; records the information, included in the medical information, in a layer corresponding to an item related to the medical data from among a plurality of layers classified according to a plurality of items; and creates a clinical record report based on the plurality of layers.

The information to be recorded in the layer includes meaningful frames in a clinical or engineering sense which refer to the frames including surgical information that needs to be recorded, such as the information related to the occurrence of lesions or changes in surgical tools during medical treatment including examinations, procedures, and surgery.

Referring to FIG. 4, the layers 400 generated by the method for generating clinical record data according to one embodiment of the present disclosure may include a first layer group and a second layer group.

The first layer group is composed of layers for recording medical data related to previous medical treatment, which includes voice and bio-signals of the medical staff, surgical images, and bio-signals of a patient.

For example, the first layer group may include a first layer 410, a second layer 420, a third layer 430, and a fourth layer, where the first layer 410 records the medical staff's voice 411 and separately recorded text during a medical treatment including examinations, procedures, and surgery.

The second layer 420 includes the medical staff's bio-signals during a medical treatment including examinations, procedures, and surgery.

The third layer 430 includes images 431 of a patient, including those from examinations, procedures, and surgeries.

The fourth layer includes bio-signals of a patient from medical treatment, including those from examinations, procedures, and surgeries.

The second layer group is composed of layers recording information on feature frames that include feature information to be recorded in the image data among medical data.

In particular, the information of a detected feature frame is visualized in the temporal order.

For example, the second layer group includes a fifth layer 450, a sixth layer 460, a seventh layer 470, and an eighth layer 480, where the fifth layer 450 includes information on any lesions, such as polyps or nodules, present in the image.

The sixth layer 460 includes information on non-lesioned objects, such as blood, instruments, feces, and implants, present in the images.

The seventh layer 470 includes motion information related to examinations, procedures, and surgeries in the images, such as polyps and nodule excision, hemostasis, and stitching.

The eighth layer 480 provides phase information related to examinations, procedures, and surgeries within the images.

In addition to the above, the second layer group may include a ninth layer that provides position information of tools used during examinations, procedures, and surgeries in the images and may include various types of image-related meta-information in the N-th layer.

The first to Nth layers may be arranged and stored sequentially to provide hierarchical information that enables easy access for medical diagnosis.

Also, the second layer group hierarchically provides information according to its importance in medical diagnosis to facilitate access and classifies feature information to be recorded according to the displayed scale.

If more detailed information is desired, information on a lower level may be exposed by zooming in through scrolling. Accordingly, a clinical report may be created based on a plurality of layers according to the importance of feature information in the clinical record data.

Figure 5:
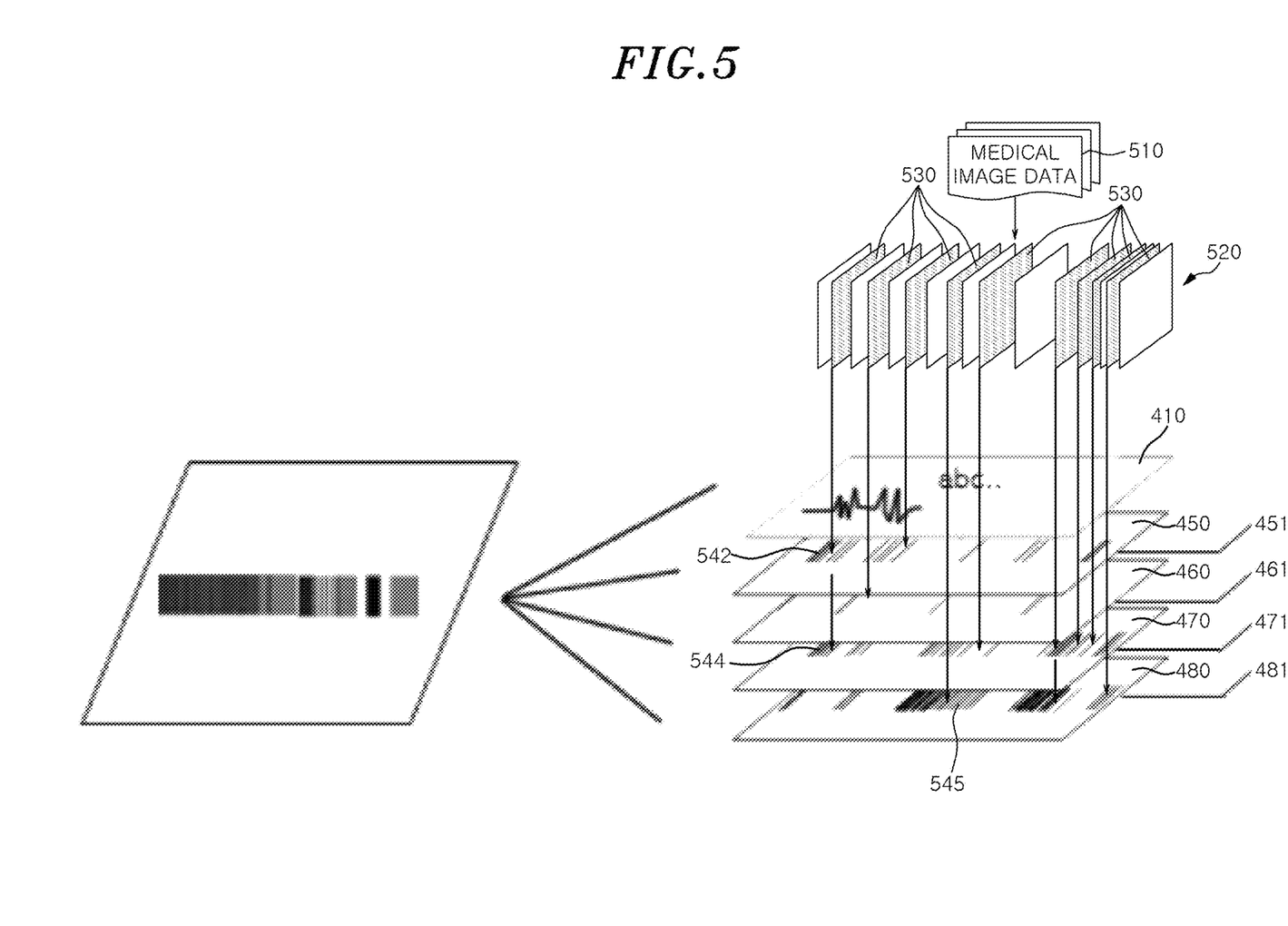

FIG. 5 illustrates a layer generation process by a method for generating clinical record data according to one embodiment of the present disclosure.

Specifically, FIG. 5 illustrates a process of recording information on a feature frame in a plurality of layers of the second layer group using image data among medical data according to a method for generating clinical record data according to one embodiment of the present disclosure.

The device for generating clinical record data according to one embodiment of the present disclosure partitions at least part of the image data 510 among medical data into a plurality of image frames 520.

Here, partitioning the image data into the plurality of image frames 520 refers to partitioning the image data 510 at predetermined time intervals.

Afterward, a feature extraction algorithm is performed on each of the plurality of image frames 520, a feature frame that includes feature information to be recorded during medical treatment is extracted, and the information on the feature frame is recorded in a plurality of layers of the second layer group.

Specifically, from among a plurality of layers classified according to a plurality of event items, information on a feature frame is recorded in a layer corresponding to an event item related to feature information included in the feature frame.

For example, a feature frame 530 including information on lesions present in the image is extracted from the image frames 520, and the information on the lesions present in the image, such as polyps or nodules, is recorded in the fifth layer 450. Here, the event item corresponds to the lesion present in the image 451.

Also, a feature frame 530 including information on non-lesioned objects present in the image is extracted from the image frames 520, and the information on the non-lesioned objects (such as blood, instruments, feces, and implants) present in the image is recorded in the sixth layer 460. Here, the event item corresponds to the non-lesioned object present in the image 461.

Also, a feature frame 530 including motion information related to examinations, procedures, and surgeries in the image is extracted from the image frames 520, and the motion information (such as polyps and nodule excision, hemostasis, and stitching) related to examinations, procedures, and surgeries in the image is recorded in the seventh layer 470. Here, the event item corresponds to the motion information related to examinations, procedures, and surgeries in the image 471.

Also, a feature frame 530 including phase information related to examinations, procedures, and surgeries present in the image is extracted from the image frames 520, and the phase information related to examinations, procedures, and surgeries present in the image is recorded in the eighth layer 480. Here, the event item corresponds to the phase information related to examinations, procedures, and surgeries in the image 481.

The first layer group is composed of layers for recording medical data related to previous medical treatment, which includes voice and bio-signals of the medical staff, surgical images, and bio-signals of a patient.

The individual layers of the second layer group may be generated sequentially together with the first layer group that includes voice and bio-signals of the medical staff, surgical images, and bio-signals of a patient; the user may specify a particular layer from the first and second groups or check only the relevant information by indicating a separate period.

As described in FIG. 5, the device for generating clinical record data according to one embodiment of the present disclosure performs a feature extraction algorithm on each of the plurality of image frames 520, extracts a feature frame 530 that includes feature information to be recorded during medical treatment, and records the information on the feature frame in a plurality of layers of the second layer group.

Specifically, the feature extraction algorithm includes image processing algorithms and machine learning algorithms.

Here, the feature information includes at least one of clinical information and metadata information, where the clinical information includes at least one of lesion information and non-lesioned object information, and the metadata information includes at least one of medical operation information and medical tool information.

Also, clinical information refers to clinical indicators. For example, examples of clinical indicators in robotic surgery include the total surgical procedure time, the duration of specific procedures (which include flap dissection, midline division, isthmectomy, lateral dissection, superior pole ligation, RLN, parathyroid identification & preservation, superior pole ligation, and central neck dissection time), location of the tumor (left/right; top/middle/bottom), the existence of enlarged lymph nodes, preservation of recurrent laryngeal nerve, and preservation of parathyroid gland. Also, the clinical indicators include the presence of blood vessel damage during surgery, the degree of bleeding, damage to other organs, adequacy of imaging, and specific findings identified from imaging.

Metadata information refers to meta-information. Examples of meta-information in a robot surgery video include the time when a surgical tool goes out of the screen, when surgical tools collide with each other, when a movement exceeds a specific acceleration, and when surgical tools are changed (e.g., when forceps are replaced with another instrument due to camera movement and zoom in/out).

FIGS. 6A to 6F illustrate exemplary medical tools in the process of extracting a feature frame by a method for generating clinical record data according to one embodiment of the present disclosure.

Figure 6A:
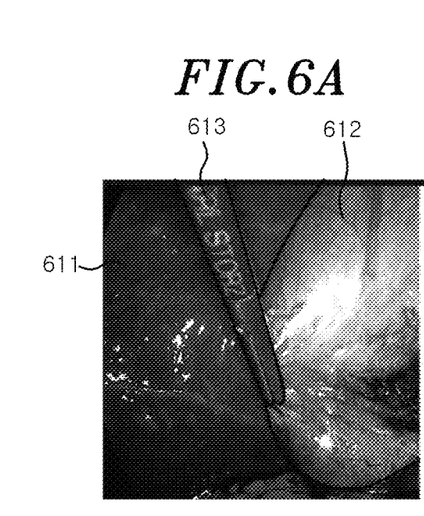
FIGS. 6A to 6F illustrate exemplary medical tools in the process of extracting a feature frame by a method for generating clinical record data according to one embodiment of the present disclosure.
Figure 6B:
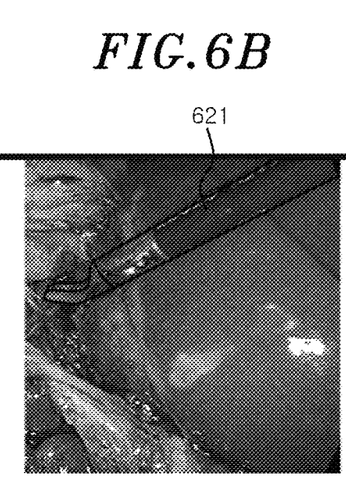
Figure 6C:
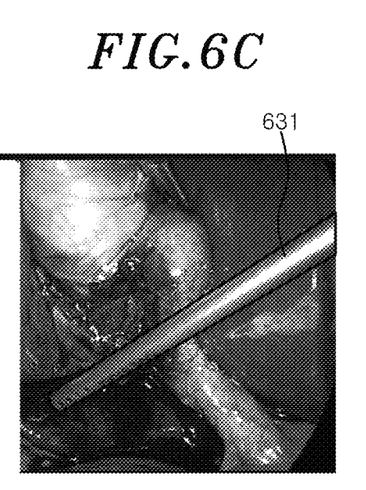
Figure 6D:
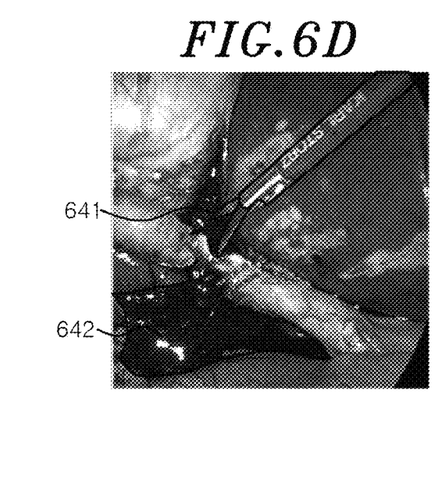
Figure 6E:
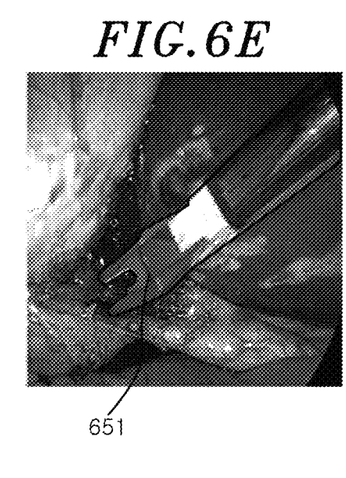
Figure 6F:
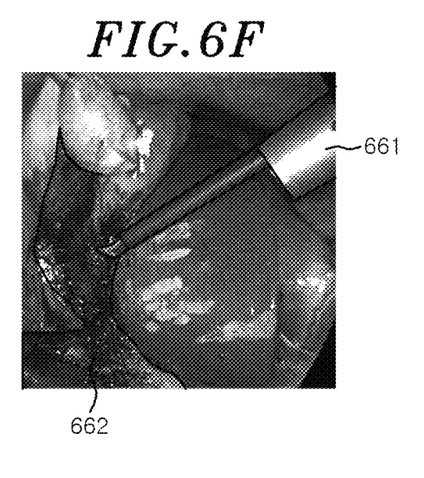

FIG. 6A shows a long grasper 613, FIG. 6B shows dissector forceps 621, FIG. 6C shows an exhauster 631, FIG. 6D shows scissors 641, FIG. 6E shows a clipping device 651, and FIG. 6F shows a monopolar spatula 661.

Specifically, according to one embodiment of the present disclosure, when an image processing algorithm is used, the step of extracting a feature frame including feature information designates one point of a shape corresponding to a medical tool as a feature point, tracks the position of the feature point at predetermined time intervals over a plurality of image frames, and extracts an image frame corresponding to the time point at which the position of the medical tool is changed as a feature frame.

For example, in FIG. 6A, the step of extracting the feature frame may designate the first surgical spot 611 and the second surgical spot 612 as background areas, recognize a shape corresponding to the medical tool using a filter generated according to each of a plurality of channels that allow edges only in predetermined orientations to pass within the background areas, determine the type of medical tool based on the shape, and check the movement of the medical tool.

Here, the filtering process involves selectively detecting an image at a specific angle set from the image of target information. According to one embodiment of the present disclosure, the processor may include a circular filter for recognizing the image of target information and an elliptical orientation recognition filter located inside the circular filter; as the orientation recognition filter detects a vertical line, the processor may recognize the shape of a medical tool.

In addition to the above, various image processing algorithms may be used to determine the type of medical tool and check the movement thereof. For example, object tracking and targeting methods may be used.

Also, referring to FIGS. 6D and 6F, according to one embodiment of the present disclosure, the step of extracting the feature frame including feature information may identify bleeding spots 642, 662 using an image processing algorithm.

Specifically, among the plurality of image frames, the processor may designate the first surgical spot 611 and the second surgical spot 612 as reference frames, determine the shape corresponding to a lesion or a non-lesioned object by comparing the reference frames and the respective image frames, extract the image frame including the shape of the lesion or the non-lesioned object as a feature frame, and identify bleeding spots, which correspond to non-lesioned objects, in the cases of FIGS. 6D and 6F.

FIGS. 7A to 7D illustrate exemplary surgical information in the process of extracting a feature frame by a method for generating clinical record data according to one embodiment of the present disclosure.

Figure 7A:
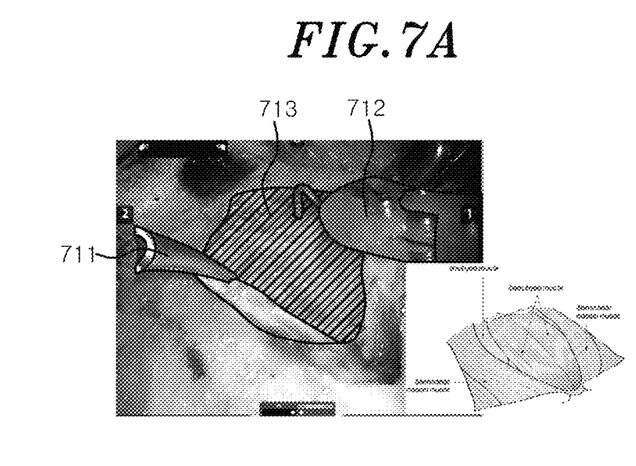
FIGS. 7A to 7D illustrate exemplary surgical information in the process of extracting a feature frame by a method for generating clinical record data according to one embodiment of the present disclosure.
Figure 7B:
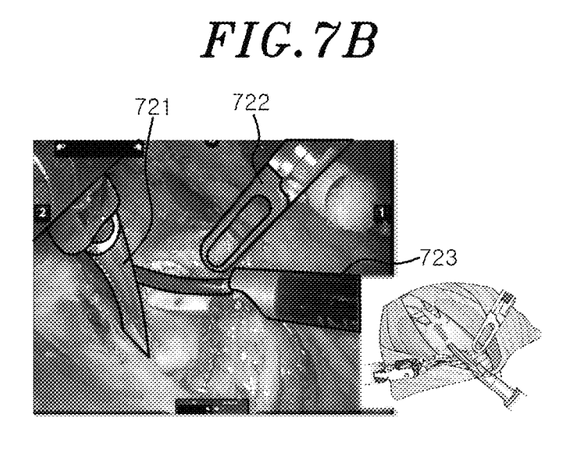
Figure 7C:
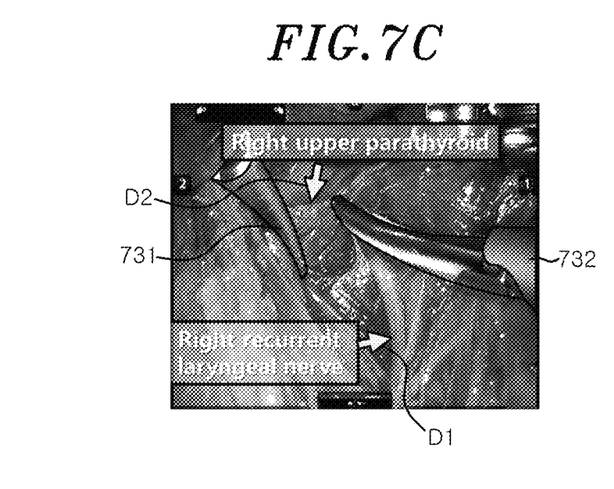
Figure 7D:
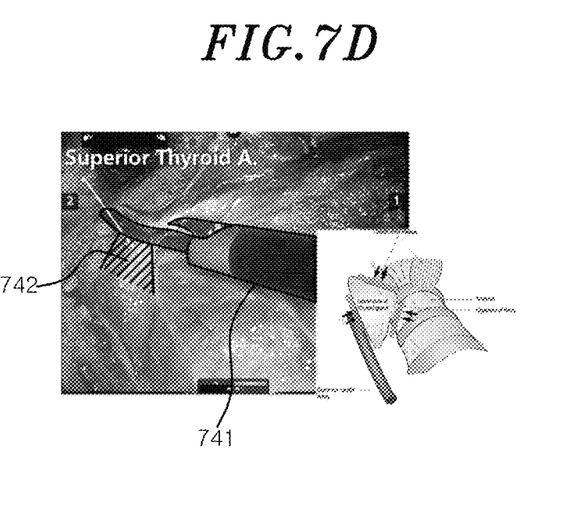

FIG. 7A shows midline division, FIG. 7B shows isthmectomy, FIG. 7C shows RLN parathyroid preservation, and FIG. 7D shows superior pole ligation.

From FIG. 7A, a first medical tool 711, a second medical tool 712, and a surgical spot 713 may be recognized using an image processing algorithm, where the corresponding surgical information may be checked by recognizing the change in the first medical tool 711, the second medical tool 712, and the surgical spot 713. Also, based on the corresponding surgery information, change of medical tools and conditions of an affected area may be checked.

From FIG. 7B, a first medical tool 721, a second medical tool 722, and a third medical tool 723 may be recognized using an image processing algorithm, where the progress of isthmectomy may be determined according to the movement of the third medical tool 723.

From FIG. 7C, a first medical tool 731 and a second medical tool 732 may be recognized, and the direction D1 of a first nerve and the direction D2 of a first surgical spot may be checked.

From FIG. 7D, a first medical tool 741 and a surgical spot 742 may be checked using an image processing algorithm.

Figure 8A:
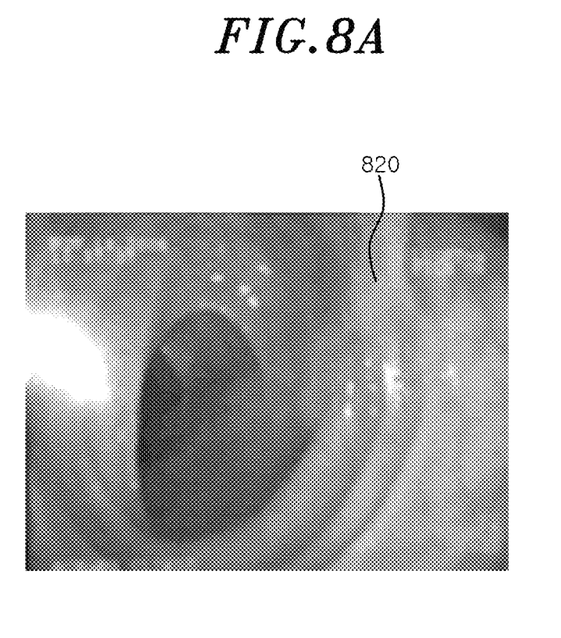
FIGS. 8A and 8B illustrate recognition of a tumor in the process of extracting a feature frame by a method for generating clinical record data according to one embodiment of the present disclosure.
Figure 8B:
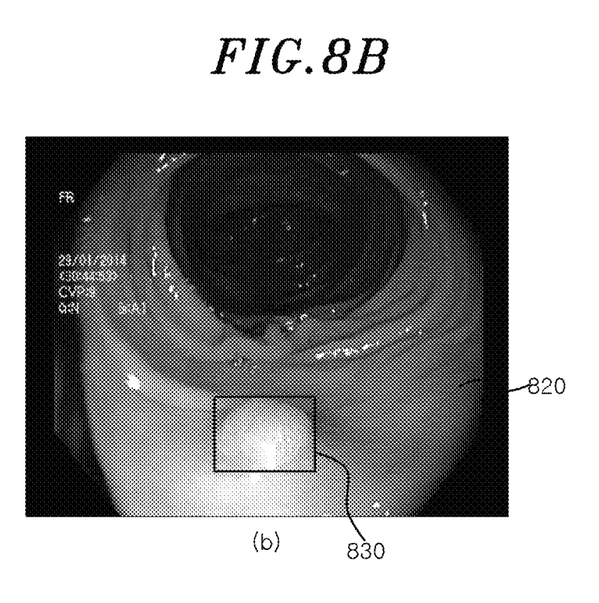

FIGS. 8A and 8B illustrate recognition of a tumor in the process of extracting a feature frame by a method for generating clinical record data according to one embodiment of the present disclosure.

FIG. 8A shows an in vivo image in the absence of a tumor, while FIG. 8B shows an in vivo image when a tumor is present.

According to another embodiment of the present disclosure, when a machine learning algorithm is used, the step of extracting a feature frame including feature information uses a model pre-trained for the pixel correlation among a plurality of image frames 820 based on the in vivo images for learning and lesion images for learning to determine a shape 830 corresponding to a lesion from each of the plurality of image frames and extracts an image frame including the shape corresponding to the lesion as a feature frame.

Specifically, FIG. 8A may be used as an in vivo image for training, and FIG. 8B may be used as a lesion image for training. By providing a plurality of image frames to a model pre-trained using the in vivo images for training and lesion images for training, the model may identify the shape of a lesion.

Also, as a learning model, a YOLO model that classifies a desired object may be trained; after training the model using lesion images for learning, which correspond to the shapes of lesions to be classified, and in vivo images for learning, an image frame may be input to the model to extract a feature frame.

FIGS. 9A to 11 illustrate a clinical report generated by a method for generating clinical record data according to one embodiment of the present disclosure.

The processor of the device for generating clinical record data according to one embodiment of the present disclosure creates a clinical report based on a plurality of layers according to the importance of feature information. Here, the clinical report refers to clinical report images expressed through visualization, which may be visualized as shown in FIGS. 9A, 9B, and 10 or may be generated in the form of an image with embedded text, as shown in FIG. 11.

FIGS. 9A to 11 illustrate an example of a clinical report on the colonoscopy and procedure.

Examples of clinical indicators in the colonoscopy and procedure may include past medical records, a surgical history, whether an endoscope reaches the appendix, appendix reach time, recovery time, the total examination time, (right, traverse, left, and summed) colon cleansing, colon cleaning (feces), CFS findings, and information on the polyp found (location, size, shape, and biopsy information); and may further include the time of polyp removal.

Examples of meta-information on colonoscopy and procedure videos may include the position, forward movement, backward movement, stop, left/right movement of an endoscope, water washing, and gas injection.

Specifically, FIGS. 9A and 9B illustrate a first embodiment of a clinical report created by the method for generating clinical record data according to one embodiment of the present disclosure.

FIG. 9A shows the position of the endoscope tip. Referring to FIG. 9B, images according to the positions of the endoscope tip may be checked as the procedure progresses, and an image may be recorded when feature information is generated in the corresponding image.

At this time, by designating the horizontal axis to represent the colonoscopy procedure time and the vertical axis to represent the degree of colon cleansing, the image position may be specified according to the procedure time and the degree of cleansing. As shown in FIG. 9B, the positions of the first image 910, the second image 920, and the third image 930 may be specified.

FIG. 10 illustrates a second embodiment of a clinical report created by the method for generating clinical record data according to one embodiment of the present disclosure.

Referring to FIG. 10, a clinical report may be created by visualizing 940 the position of the endoscope tip and mapping the information on the colon's anatomical position to the time information.

The frame 942 extracted from the anatomical position information may be recorded, and the time density 941 may be displayed differently according to the amount of frame data due to the position information.

Specifically, by mapping the information on the colon's anatomical position to the time information, the procedure's progress over time may be visually grasped; since the main procedure of the colonoscopy is performed while the endoscope is coming out after the appendix is reached, the procedure is recorded with respect to the time when the appendix is reached. At this time, the time density due to the position is displayed in different colors so that a delay in the procedure or the position where the treatment has occurred may be identified.

Also, when the cursor approaches a time point requiring confirmation, information corresponding to a desired function (e.g., a procedure video, degree of colon cleansing, voice, and bio-signals) may be provided.

FIG. 11 illustrates a third embodiment of a clinical report created by the method for generating clinical record data according to one embodiment of the present disclosure.

Referring to FIG. 11, together with an image displaying a bleeding spot 1010, a clinical report may be created by converting a voice signal of 'There is visible bleeding' to text 1020 from the voice signals in the previously obtained medical data.

Specifically, during examinations, procedures, and surgeries, a doctor's opinion or the corresponding situation is recorded along with images; when the images are played, the recorded data are converted into text and provided in the form of subtitles.

Clinical report images may be created by automatically editing image frames corresponding to clinically important information, such as those related to nodules, polyps, bleeding, and resection, through AI and voice input distribution; through highlight images, main information may be quickly grasped without having to play the whole video lasting 20 to 40 minutes.

Also, as a computer program stored in a computer-readable recording medium, the computer program provides instructions to instruct a processor to execute a method for generating clinical record data.

Also, the method for generating clinical record data according to one embodiment of the present disclosure is recorded in a non-transitory computer-readable recording medium including computer program commands that may be executed by the processor, and the present disclosure provides a recording medium that records a computer-readable program related to the method for generating clinical record data to be executed by a computer. The computer-readable recording medium may also include, alone or in combination with the program instructions, data files, data structures, and the like. Examples of computer-readable recording medium include magnetic media, such as hard disks, floppy disks, and magnetic tape; optical media such as CD ROM disks and DVDs; magneto-optical media such as a floptical disk, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

The above description is merely exemplary description of the technical scope of the present disclosure, and it will be understood by those skilled in the art that various changes and modifications can be made without departing from original characteristics of the present disclosure. Therefore, the technical scope of the present disclosure should is not limited by the embodiments, and should be interpreted based on the following claims and it should be appreciated that all technical scopes included within a range equivalent thereto are included in the protection scope of the present disclosure.

The invention claimed is:

1. A method for generating clinical record data performed by a device for generating clinical record data, the method comprising:
  receiving medical data in which medical treatment, performed in advance, is recorded;
  recording information, included in the medical data, in a layer corresponding to an item related to the medical data from among a plurality of layers classified according to a plurality of items; and
  generating a clinical report based on the plurality of layers,
  wherein the recording the information includes:
    classifying the medical data according to data type based on a voice signal and bio-signals of medical staff, image data, and bio-signals of a patient, and respectively recording the medical data in a layer corresponding to the data type among a plurality of layers in a first layer group; and
    recording information on the image data among the medical data in a layer corresponding to information identified in the image data among a plurality of layers in a second layer group corresponding to information identified through the image data.

2. The method of claim 1, wherein the recording information on the image data among the medical data includes:
  partitioning at least part of image data into a plurality of image frames;
  performing a feature extraction algorithm on each of the plurality of image frames and extracting a feature frame including feature information to be recorded during the medical treatment; and
  recording the information on the feature frame in a layer corresponding to an event item related to the feature information among a plurality of layers of the second layer group.

3. The method of claim 2, wherein the generating of the clinical report based on the plurality of layers generates the clinical report by designating at least a part of the plurality of layers of the first layer group and the plurality of layers of the second layer group according to their importance.

4. The method of claim 2, wherein the feature information includes at least one of clinical information and metadata information, wherein the clinical information includes at least one of lesion information and non-lesioned object information, and wherein the metadata information includes at least one of medical operation information and medical tool information.

5. The method of claim 4, wherein the extracting of the feature frame including the feature information designates one of the plurality of image frames as a reference frame, compares the reference frame with each of remaining image frames, determines a shape corresponding to a lesion or a non-lesioned object, and extracts an image frame including the shape corresponding to the lesion or non-lesioned object as a feature frame.

6. The method of claim 4, wherein the extracting of the feature frame including the feature information designates one point of a shape corresponding to a medical tool as a feature point, tracks a position of the feature point at predetermined time intervals over the plurality of image frames, and extracts an image frame corresponding to a time point at which a position of the medical tool changes as the feature frame.

7. The method of claim 4, wherein the extracting of the feature frame including the feature information uses a model pre-trained for a pixel correlation among the plurality of image frames based on in vivo images for learning and lesion images for learning to determine a shape corresponding to a lesion from each of the plurality of image frames; and extracts an image frame including the shape corresponding to the lesion as the feature frame.

8. The method of claim 4, wherein the information on the feature frame includes graphic information of the feature frame and visual information at a time the feature frame is positioned among the image data.

9. The method of claim 8, wherein the generating of the clinical report based on the plurality of layers generates the clinical report using the information on the feature frame in a preset period among the plurality of layers of the first layer group and the plurality of layers of the second layer group.

10. The method of claim 2, wherein the recording in the plurality of layers of the second layer group records graphic information of the feature frame in the layer corresponding to the event item related to the feature information and stores visual information at a time the feature frame is positioned together as an event index.

11. A device for generating clinical record data, the device comprising:
  a memory; and
  a processor executing one or more instructions stored in the memory, wherein the instructions, when executed by the processor, cause the processor to perform actions including:
  receiving medical data in which medical treatment, performed in advance, is recorded;
  recording information, included in the medical data, in a layer corresponding to an item related to the medical data from among a plurality of layers classified according to a plurality of items;
  generating a clinical report based on the plurality of layers;
  classifying the medical data according to data type based on a voice signal and bio-signals of medical staff, image data, and bio-signals of a patient, and respectively recording the medical data in a layer corresponding to the data type among a plurality of layers in a first layer group; and
  recording information on the image data among the medical data, in a layer corresponding to information identified in the image data among a plurality of layers in a second layer group corresponding to information identified through the image data.

12. The device of claim 11, wherein the recording information on the image data among the medical data includes:
  partitioning at least part of image data into a plurality of image frames;
  performing a feature extraction algorithm on each of the plurality of image frames and extracting a feature frame including feature information to be recorded during the medical treatment; and recording the information on the feature frame in a layer corresponding to an event item related to the feature information among a plurality of layers of the second layer group.

13. The device of claim 12, wherein the generating of the clinical report based on the plurality of layers generates the clinical report by designating at least a part of the plurality of layers of the first layer group and the plurality of layers of the second layer group according to their importance.

14. The device of claim 12, wherein the feature information includes at least one of clinical information and metadata information, wherein the clinical information includes at least one of lesion information and non-lesioned object information, and wherein the metadata information includes at least one of medical operation information and medical tool information.

15. The device of claim 14, wherein the extracting of the feature frame including the feature information designates one of the plurality of image frames as a reference frame, compares the reference frame with each of remaining image frames, determines a shape corresponding to a lesion or a non-lesioned object, and extracts an image frame including the shape corresponding to the lesion or non-lesioned object as a feature frame.

16. The device of claim 14, wherein the extracting of the feature frame including the feature information designates one point of a shape corresponding to a medical tool as a feature point, tracks a position of the feature point at predetermined time intervals over the plurality of image frames, and extracts an image frame corresponding to a time point at which a position of the medical tool changes as the feature frame.

17. The device of claim 14, wherein the extracting of the feature frame including the feature information uses a model pre-trained for a pixel correlation among the plurality of image frames based on in vivo images for learning and lesion images for learning to determine a shape corresponding to a lesion from each of the plurality of image frames; and extracts an image frame including the shape corresponding to the lesion as the feature frame.

18. The device of claim 14, wherein the information on the feature frame includes graphic information of the feature frame and visual information at a time the feature frame is positioned among the image data.

19. The device of claim 12, wherein the recording in the plurality of layers of the second layer group records graphic information of the feature frame in the layer corresponding to the event item related to the feature information and stores visual information at a time the feature frame is positioned together as an event index.

20. A non-transitory computer-readable storage medium including computer executable instructions, wherein the instructions, when executed by a processor, cause the processor to perform a method for generating clinical record data, the method comprising:
   receiving medical data in which medical treatment, performed in advance, is recorded;
   recording information, included in the medical data, in a layer corresponding to an item related to the medical data from among a plurality of layers classified according to a plurality of items; and
   generating a clinical report based on the plurality of layers,
   wherein the recording the information includes:
      classifying the medical data according to data type based on a voice signal and bio-signals of medical staff, image data, and bio-signals of a patient, and respectively recording the medical data in a layer corresponding to the data type among a plurality of layers in a first layer group; and
      recording information on the image data among the medical data, in a layer corresponding to information identified in the image data among a plurality of layers in a second layer group corresponding to information identified through the image data.

* * * * *